United States Patent
Bernier et al.

(10) Patent No.: US 11,889,460 B2
(45) Date of Patent: Jan. 30, 2024

(54) EQUIPMENT TRACKING SYSTEM

(71) Applicant: BRIGGS & STRATTON, LLC, Wauwatosa, WI (US)

(72) Inventors: Kevin Bernier, Wauwatosa, WI (US); Mario Divis, Wauwatosa, WI (US); Peter Douglas Shears, Wauwatosa, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 51 days.

(21) Appl. No.: 17/077,721

(22) Filed: Oct. 22, 2020

(65) Prior Publication Data
US 2021/0127348 A1    Apr. 29, 2021

Related U.S. Application Data

(60) Provisional application No. 62/925,044, filed on Oct. 23, 2019.

(51) Int. Cl.
*H04W 4/029* (2018.01)
*H04W 64/00* (2009.01)
*H04W 88/16* (2009.01)
*G07C 3/02* (2006.01)
*G06F 16/901* (2019.01)

(52) U.S. Cl.
CPC ........ *H04W 64/003* (2013.01); *G06F 16/901* (2019.01); *G07C 3/02* (2013.01); *H04W 4/029* (2018.02); *H04W 64/006* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 2012/0161958 A1* | 6/2012 | Turon | G01S 19/34 340/539.3 |
| 2014/0070924 A1* | 3/2014 | Wenger | B25F 5/00 340/10.1 |
| 2014/0240125 A1* | 8/2014 | Burch | B25H 3/02 340/539.13 |
| 2015/0039269 A1* | 2/2015 | Mejegard | B60W 50/14 702/182 |

(Continued)

Primary Examiner — German Viana Di Prisco
(74) Attorney, Agent, or Firm — Foley & Lardner LLP

(57) ABSTRACT

Systems and apparatuses include an endpoint structured to be coupled to an outdoor power equipment and including an operation sensor structured to provide operational information indicative of an operational status of the outdoor power equipment, and a transmitter structured to wirelessly transmit the operational information; and a gateway including a receiver structured to receive the operational information from the endpoint, and one or more processing circuits comprising one or more memory devices coupled to one or more processors, the one or more memory devices configured to store instructions thereon that, when executed by the one or more processors, cause the one or more processors to: associate the operational information with a timestamp, record a history of operational information and associated timestamps, and transmit the history to an external device.

19 Claims, 11 Drawing Sheets

(56) References Cited

U.S. PATENT DOCUMENTS

| | | | |
|---|---|---|---|
| 2015/0116132 A1* | 4/2015 | Nohra | H04Q 9/00 |
| | | | 340/870.07 |
| 2017/0349058 A1* | 12/2017 | Bernier | H02J 3/32 |
| 2018/0329407 A1* | 11/2018 | Disisto | G07C 3/02 |
| 2019/0077003 A1* | 3/2019 | Lennings | G05B 19/05 |
| 2019/0160646 A1* | 5/2019 | Hoossainy | G01S 19/33 |

* cited by examiner

| CREW | NAME | MAKE | MODEL | SERIAL NUMBER | CURRENT HOURS | BATTERY STATUS | ESN | MAC ADDRESS | LAST REPORT | ADDED TO THE FLEET |
|---|---|---|---|---|---|---|---|---|---|---|
| BOB'S CREW | 402→ BOB'S TRUCK | FORD | F350 | YYG123456 | 230 | 13 VOLTS | 1363013456 | NA | 8/6/19 | 7/6/19 |
| BOB'S CREW | 404→ TRIMMER | STIHL | FS165 | YYG123456 | 36 | 95% | NA | 123456 | 8/5/19 | 7/6/19 |
| BOB'S CREW | 406→ BLOWER | RED MAX | OU812 | YYG123456 | 26 | 75% | NA | 123456 | 8/4/19 | 7/6/19 |
| BOB'S CREW | 408→ EDGER | STIHL | FS136 | YYG123456 | 15 | 75% | NA | 123456 | 8/5/19 | 7/6/19 |
| BOB'S CREW | 410→ TRIMMER-CURVED | STIHL | FS45 | YYG123456 | 99 | 60% | NA | 123456 | 7/29/19 | 7/6/19 |

| CREW | EQUIPMENT | MAKE | MODEL | PLANNED EQUIPMENT | MONDAY AUG 5, 2019 | TUESDAY AUG 6, 2019 | WEDNESDAY AUG 7, 2019 | THURSDAY AUG 8, 2019 | FRIDAY AUG 8, 2019 |
|---|---|---|---|---|---|---|---|---|---|
| TRUK 17  510→ | 402→ BOB'S TRUCK | FORD | F350 |  | 530→ ☒ | 528→ ☒ | ☒ | ☒ | ☒ |
| TRUK 17 | 404→ TRIMMER | STIHL | FS165 | * | ☒ | ☒ | 508 ☒ 512 | ☒ 514 | ☒ |
| TRUK 17 | 406→ BLOWER | RED MAX | OU812 | * | ☒ | ☒ | ☒ | ☒ | ☒ |
| TRUK 17 | 408→ EDGER | STIHL | FS136 | * | ☒ | ☒ | ☒ | ☒ | ☒ |
| TRUK 17 | 410→ TRIMMER-CURVED | STIHL | FS45 |  |  | ☒ | 516 ☒ | | 520 |
| TRUK 20 | 502→ TRIMMER | STIHL | FS155 |  |  | ☒ | 518 | | ☒ |
| TRUK 20  506→ | 504→ PUSH MOWER | TORO | 22" |  |  |  |  |  |  |
| TRUK 20  510→ | JOHN'S TRUCK | FORD | F350 |  | ☒ | ☒ | ☒ | ☒ | ☒ |
| TRUK 20 | TRIMMER | STIHL | FS155 | * | ☒ | ☒ | ☒ | ☒ | ☒ |
| TRUK 20 | PUSH MOWER | TORO | 22" | * | ☒ | ☒ | ☒ | ☒ | ☒ |
| TRUK 20 | WALK MOWER | FERRIS | FW35 | * | ☒ | ☒ | ☒ | ☒ | 526 ☒ |
| TRUK 17  510→ | 524→ EDGER | STIHL | FS136 |  |  |  |  | ☒ | ☒ |

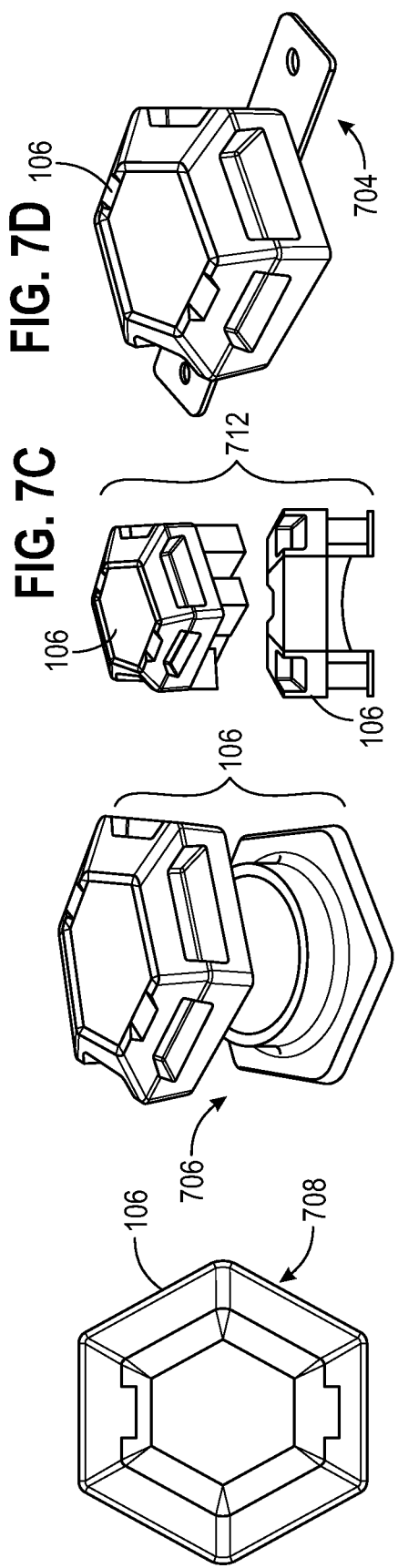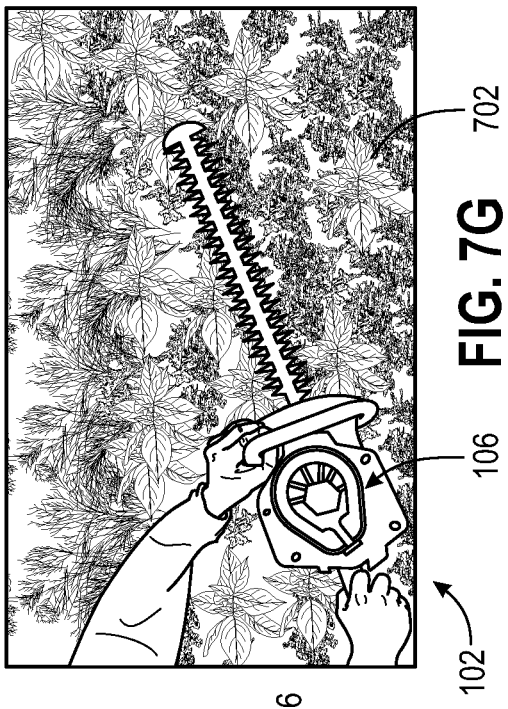

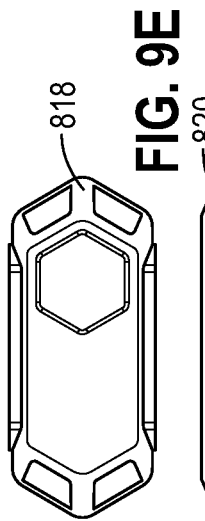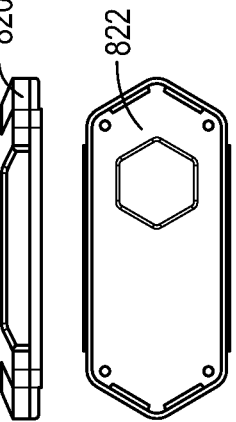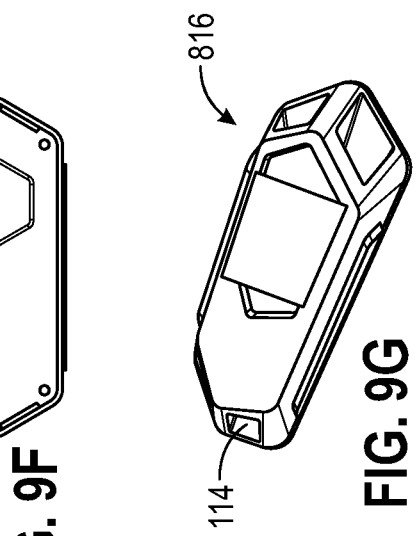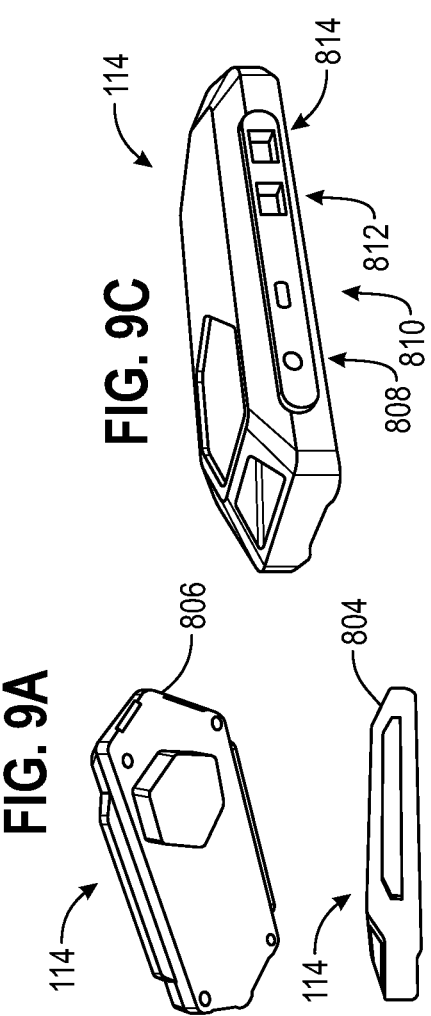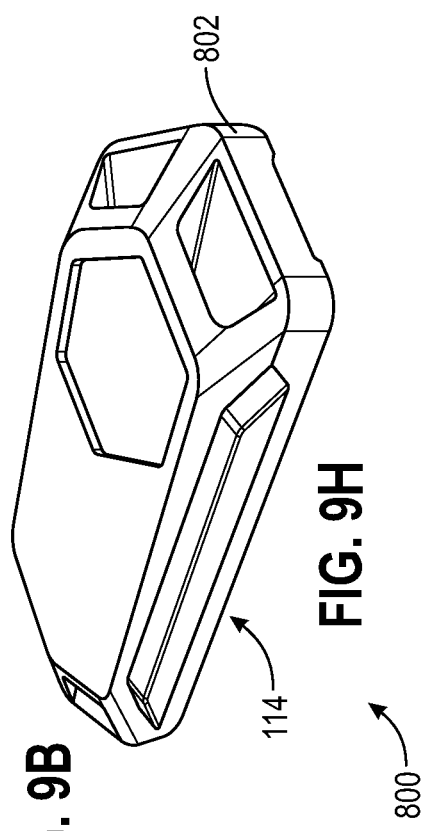

EQUIPMENT TRACKING SYSTEM

CROSS-REFERENCE TO RELATED PATENT APPLICATIONS

This application claims the benefit of U.S. Provisional Patent Application No. 62/925,044, filed on Oct. 23, 2019, the entire contents of which are incorporated herein by reference.

BACKGROUND

The present invention generally relates to outdoor power equipment. More specifically, the present application relates to an equipment tracking system for outdoor power equipment.

SUMMARY

At least one embodiment relates to an equipment tracking system that includes an endpoint structured to be coupled to an outdoor power equipment and including an operation sensor structured to provide operational information indicative of an operational status of the outdoor power equipment, and a transmitter structured to wirelessly transmit the operational information; and a gateway including a receiver structured to receive the operational information from the endpoint, and one or more processing circuits comprising one or more memory devices coupled to one or more processors, the one or more memory devices configured to store instructions thereon that, when executed by the one or more processors, cause the one or more processors to: associate the operational information with a timestamp, record a history of operational information and associated timestamps, and transmit the history to an external device.

Another embodiment relates to a system that includes one or more processing circuits comprising one or more memory devices coupled to one or more processors, the one or more memory devices configured to store instructions thereon that, when executed by the one or more processors, cause the one or more processors to: identify a type of an outdoor power equipment, receive, from an endpoint physically coupled to the outdoor power equipment, operational information indicative of an operational status of the outdoor power equipment and endpoint location information indicative of a location of the outdoor power equipment, associate the operational information and the endpoint location information with a timestamp, record a history of operational information, endpoint location information, and associated timestamps, generate an inventory based on the endpoint location information, generate a report including the history and the inventory, and transmit the report to an external device.

Another embodiment relates to a method that includes installing an endpoint on an outdoor power equipment; installing a gateway in a vehicle; associating the endpoint with the gateway, identifying a type of an outdoor power equipment within the gateway, determine a range of operational vibrational frequencies and magnitudes of the type of the outdoor power equipment, wirelessly communicating, from the endpoint to the gateway, operational information and endpoint location information indicative of a location of the outdoor power equipment, determine an operation state of the outdoor power equipment based on the operational information and the determined range of operational vibrational frequencies and magnitudes, associate the operation status and the endpoint location information with a timestamp, record a history of operation status, endpoint location, and associated timestamps, generate an inventory based on the endpoint location information, generate a report including the history and the inventory, and transmit the report to an external device.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The disclosure will become more fully understood from the following detailed description, taken in conjunction with the accompanying figures.

FIG. 4 is a report depicting equipment assigned to a crew, according to an exemplary embodiment.

FIG. 5 is a report depicting crew equipment changes, according to an exemplary embodiment.

FIGS. 7A-G is a series of perspective views of an endpoint to be used in the equipment tracking system of FIG. 1A, according to an exemplary embodiment.

FIGS. 9A-H is a series of perspective views of a gateway to be used with the equipment tracking system of FIG. 1A, according to an exemplary embodiment.

DETAILED DESCRIPTION

Figure 1A:
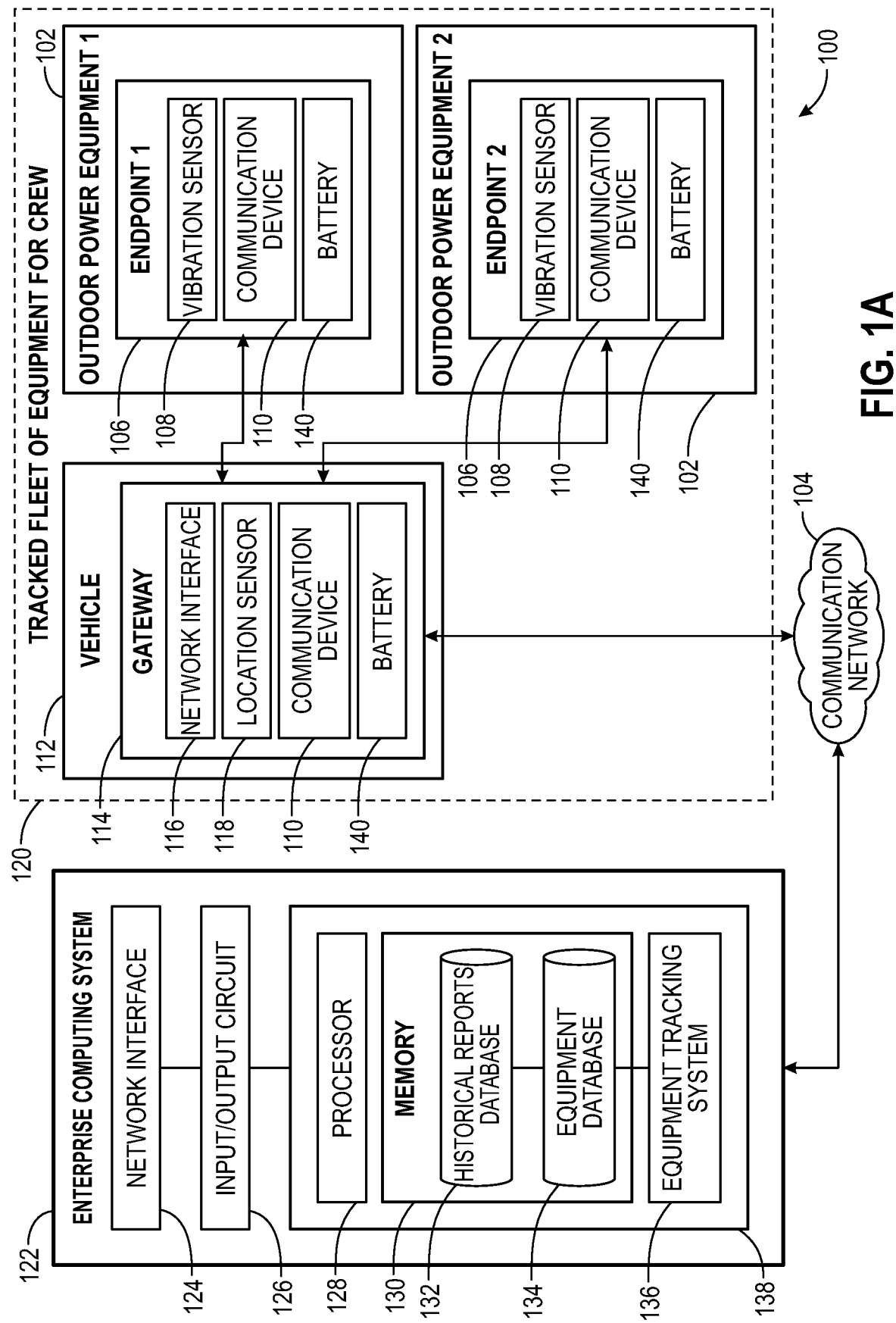
FIG. 1A is an environment for tracking outdoor power equipment, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to some embodiments, as described in further detail below, tracking the on and off (on/off) status and inventory of outdoor power equipment may improve the proof of service, security, and productivity of a fleet of outdoor power equipment (e.g., completing a job for a client). Outdoor power equipment includes lawn mowers, riding tractors, snow throwers, fertilizer spreaders, salt spreaders, chemical spreaders, pressure washers, tillers, log splitters, zero-turn radius mowers, walk-behind mowers, wide area walk-behind mowers, riding mowers, stand-on mowers, pavement surface preparation devices, industrial vehicles such as forklifts, utility vehicles, commercial turf equipment such as blowers, vacuums, debris loaders, overseeders, power rakes, aerators, sod cutters, brush mowers, etc. The inventory may also include unpowered outdoor equipment, such as wheel barrows, rakes, shovels, hoes, disposal bins, etc.

Referring to the figures generally, an equipment tracking system that monitors and tracks the use and locations of equipment (e.g., outdoor power equipment) in a fleet may receive information from a gateway and one or more endpoints coupled to the equipment to determine a runtime and a location of the equipment. The equipment tracking system provides the ability to associate the endpoints coupled to equipment with a gateway, detect an on/off status of the equipment, determine inventory of the equipment by taking inventory of the communicably connected endpoints coupled to the equipment, and generate alerts and/or reports on the tracked equipment. When used to track a fleet of equipment for a crew, the system provides updates and notifications on the usage of the equipment and presence of the equipment at a jobsite. As such, the system may notify users of missing equipment to help prevent equipment from being left behind at the jobsite. Additionally, the system described herein may be able to tell when a crew has different equipment than the equipment the crew was assigned to complete a job. In situations where a piece of equipment is in need of maintenance or repairs, the system may beneficially track the usage of the piece of equipment to determine the status of the equipment (e.g., when the repair or maintenance was needed, what type of repair was needed) and which operator or fleet was responsible for that piece of equipment. Another advantage of the system is the ability to provide proof-of-service to a customer that hired a crew to complete a job, such as mowing and maintaining a yard. The system may prove what pieces of equipment are used and when the equipment is used during a certain job by detecting the exact time various equipment operates (i.e., the engine is turned on) such that all equipment activity and status is tracked during and after completion of a job. Further, the system may allow a production manager of a crew to gain insight on the operation of the crewmembers during a job. For example, the production manager may see that a piece of equipment did not run until 2 hours after the vehicle carrying all of the equipment arrived at the jobsite. The system additionally may generate reports on the jobsite activity of the equipment to show the order of operating the equipment during the job, as described further below.

Referring to FIG. 1A, an environment 100 for tracking outdoor power equipment is shown, according to an exemplary embodiment. As further described in detail below, the environment 100, including the systems and methods thereof, facilitates the tracking of several pieces of outdoor power equipment in a tracked fleet 120 assigned to a crew. The environment 100 includes one or more pieces of outdoor power equipment 102 tracked by a gateway 114 via endpoints 106 coupled to each piece of outdoor power equipment (e.g., a first endpoint or endpoint 1 is coupled to a lawnmower and a second endpoint or endpoint 2 is coupled to a blower). The endpoints 106 and the gateway 114 each include communication devices 110 that are selectively communicably coupled to provide communication between the communication devices 110 of the endpoints 106 and the communication device 110 of the gateway 114. In some embodiments, each communication device 110 is a short-range communication device, such as a Bluetooth transceiver. In other embodiments, the communication device 110 can be a near field communication transceiver (NFC), a Wi-Fi receiver/transceiver, or another wireless device. In some embodiments, the gateway 114 is connected to a communication network 104. To provide communication to a cloud based application, or to communicate information to a controller, receiver, or other system located remotely from the tracked fleet 120. As used herein, endpoints (e.g., the endpoints 106) refer to physical devices (e.g., a puck formed of molded plastic) that include components for tracking equipment use. In some embodiments, the endpoints include operation sensors (e.g., a vibration sensor, an ignition sensor, a current sensor, a EMI sensor, micro switches, transmission sensors, etc.) that determine if a piece of outdoor power equipment is in use, or turned on. In some embodiments, the endpoints include a communications device that communicates with a gateway. In some embodiments, the endpoints only include a transmitter than sends information to the gateway. In some embodiments, the endpoints include a transmitter and a receiver and are structured for two-way communication with the gateway (i.e., to both send and receive information). In some embodiments, the endpoints are structured to communicate directly with a network device (e.g., a cloud computing service) either in parallel with or as an alternative to communication with the gateway. The communication devices of the gateway(s) and the endpoint(s) can include a transmitter and/or a receiver for sending and receiving information. In some embodiments, information is sent and received wirelessly. For example, Wi-Fi, Bluetooth™, cellular, or other communication protocols may be used.

An enterprise computing system 122 is connected to the communication network 104. In some embodiments, the operators of the outdoor power equipment 102 send and receive notifications over the communication network 104 via user devices, such as mobile phones, smartphones, laptop computers, desktop computers, tablets, and so on. In some embodiments, the enterprise computing system 122 sends and receives notifications to the operators of the outdoor power equipment 102 through the communication network 104.

As shown, the environment 100 includes two pieces of outdoor power equipment (e.g., outdoor power equipment 1, outdoor power equipment 2) for illustrative purposes only to show an implementation environment of the systems and methods described herein. In some embodiments, more than two pieces of outdoor power equipment 102 are assigned as a part of the tracked fleet 120 (e.g., only one piece of outdoor power equipment is tracked, several pieces of outdoor power equipment are tracked). Each of these entities may have the same or similar characteristics. In some embodiments, each piece of the outdoor power equipment 102 in the tracked fleet 120 is a different type of outdoor power equipment. In other embodiments, the tracked fleet 120 may include several of the same type of outdoor power equipment. For example, if a jobsite has a much greater area of land than normal, several blowers or lawn mowers may be assigned to a crew and may be a part of the tracked fleet 120.

In some embodiments, the gateway 114 is positioned within or on a vehicle 112. In some embodiments, the vehicle 112 is a car or truck and the vehicle 112 is towing a trailer holding the outdoor power equipment 102 assigned to the tracked fleet 120. In other embodiments, the gateway 112 is positioned inside a trailer that hauls the outdoor power equipment 102 to a jobsite for the crew.

The gateway 114 may include an internal battery 140 structured to connect to a charging source (e.g., a Universal Serial Bus (USB) outlet) of the vehicle 112. In some embodiments, the vehicle 112 may be connected to the communication network 104 (e.g., a Wi-Fi network, a cellular network, etc.). In some embodiments, the internal battery 140 of the gateway 114 is a removable, replaceable lithium-ion battery. In other embodiments, the battery 140 is rechargeable and the gateway 114 connects to a charging station of the vehicle 112 in order to recharge the battery 140. The gateway 114 may directly receive power from the vehicle 112 and may only use the battery 140 as a back-up battery when not electrically powered by the vehicle 112 (e.g., via a USB port of a truck).

The gateway 114 is shown to include a network interface 116, a location sensor 118, a communication device 110, and a battery 140. In some embodiments, the network interface 116 includes the hardware and logic necessary to communicate over multiple channels of data communication. For example, the network interface 116 may include a Wi-Fi interface, a cellular modem, a Bluetooth transceiver, a Bluetooth beacon, a (radio-frequency identification (RFID) transceiver, a near-field communication (NFC) transceiver, or a combination thereof. The network interface 116 may enable data communication to and from the gateway 114. In some embodiments, data passing through the network interface 116 is encrypted such that the communications between the gateway 114 and other entities (e.g., the enterprise computing system 122, the equipment tracking system 136, the vehicle 112, etc.) are secure. In some embodiments, the network interface 116 includes a cellular radio for cellular communication to the equipment tracking system 136. The communication device 110 may be separate from the network interface 116 of the gateway 114. In other embodiments, the communication device 110 may be integrated with the network interface 116. For example, the communication devices 110 of one or more endpoints 106 may communicate with the gateway 114 via a cellular radio within the network interface 116.

The network interface 116 of the gateway 114 may include an array of several antennas to utilize location service features available in the Bluetooth low energy (BLE) 5.1 stack when transmitting and receiving information to and from the communication devices 110 (e.g., a standard 2.4 Gigahertz (GHz) radio) of the endpoints 106. The network interface 116 of the gateway 114 may utilize received signal strength indication (RSSI) ranging and Angle of Arrival (AoA) and Angle of Departure (AoD) algorithms in order to determine the locations of the one or more endpoints 106 relative to the gateway 114 with an accuracy of within several feet. The received location information of the endpoints 106 coupled to several pieces of outdoor power equipment 102 may then be used in generating reports (e.g., report 400 (FIG. 4)) on the use of the pieces of the outdoor power equipment 102 by a crew.

In some embodiments, the gateway 114 includes a location sensor 118 in the form of a Global Positioning System (GPS) sensor and tracks the current location of the gateway 114 using the GPS data. The location data may be used in order to determine whether the gateway 114 is within a predetermined geographic boundary (e.g., a boundary for a jobsite where the crew is using the outdoor power equipment 102 to clean, trim, or mow the surrounding areas of a building). The gateway 114 may use the location data to determine when to check inventory of the endpoints 106 associated with the gateway 114 for a current job. For example, if the location of the gateway 114 is outside of a geographic boundary for the jobsite, the gateway 114 may take a count (or inventory) of each of the endpoints 106 in order to determine if all of the outdoor power equipment 102 is accounted for when leaving the jobsite.

In some embodiments, the gateway 114 also includes a Liquid Crystal Display (LCD) to display notifications on the inventory of the endpoints 106 (e.g., whether an endpoint 106 has not been accounted for in over 4 hours), tracked runtime of the outdoor power equipment 102, battery level, current job information (e.g., when the job is scheduled to be completed, how long ago the job started), and so on.

Each piece of outdoor power equipment 102 includes an endpoint 106. The outdoor power equipment 102 (e.g., the outdoor power equipment 1 and the outdoor power equipment 2) may be lawn mowers, riding tractors, snow throwers, fertilizer spreaders, salt spreaders, chemical spreaders, pressure washers, tillers, log splitters, zero-turn radius mowers, walk-behind mowers, wide area walk-behind mowers, riding mowers, stand-on mowers, pavement surface preparation devices, industrial vehicles such as forklifts, utility vehicles, commercial turf equipment such as blowers, vacuums, debris loaders, overseeders, power rakes, aerators, sod cutters, brush mowers, etc. The endpoint 106 may be coupled to the outdoor power equipment 102 using tape (e.g., very high bond (VHB) tape, double-sided tape) and may be positioned at a point closer to the engine (e.g., a gas-driven engine, diesel engines, hybrid engines) of the outdoor power equipment 102. In some embodiments, the endpoints 106 are coupled to the outdoor power equipment 102 using an adapter, adhesives, mechanical fastening, hook and look fasteners, etc. In some embodiments, the endpoints 106 on each piece of outdoor power equipment 102 is positioned in a universal location with respect to the engine of the respective outdoor power equipment 102.

The endpoints 106 are shown to include an operation sensor in the form of a vibration sensor 108, a communication device 110, and a battery 140. However, in some embodiments, the endpoints 106 operate without being attached to the battery 140. The endpoints 106 may communicate to the gateway 114 using a low-amount of energy over a Bluetooth link via the communication device 110. In some embodiments, the endpoints 106 are out of a communication range of the gateway 114. As such, the endpoints 106 may not be able to transmit equipment data when out of range of the gateway 114. For example, one of the endpoints 106 is attached to a blower and the operator uses the blower on the opposite side of a large industrial building from where the gateway 114 is inside the parked vehicle 112. In this instance, the corresponding endpoint 106 may not be able to communicate to the gateway 114 that the blower (i.e., the outdoor power equipment 102) is currently running. In some embodiments, when the endpoint 106 is unable to communicate the on/off data (i.e., the runtime data) of the outdoor power equipment 102, the endpoint 106 saves the "event" to relay back to the gateway 114 when the endpoint 106 becomes within communication range again. The "event" may be the engine of the outdoor power equipment running while the communication is lost, the engine of the outdoor power equipment turning off while the communication is lost, etc. In some embodiments, the event includes a time stamp and a status (e.g., engine start, engine off, distance travelled, etc.). Each of the endpoints 106 may have a unique identifier that is received by the gateway 114 during communication over the Bluetooth link. As such, the gateway 114 may be able to determine the different endpoints 106 and determine what outdoor power equipment 102 the respective endpoint 106 is coupled to when the gateway 114 receives the communication.

In some embodiments, the communication device 110 in each endpoint 106 is a 2.4 GHz BLE radio. In other embodiments, the communication device 110 in each endpoint 106 may also include a Global Navigation Satellite System (GNSS) radio. The GNSS radio may be used for determining the location and recording a location of operation of the piece of outdoor power equipment 102 via the respective endpoint 106 coupled to the piece of outdoor power equipment 102. The GNSS radio may be primarily powered from a battery of the outdoor power equipment 102 (e.g., a starting battery of a zero turn radius (ZTR) mower) and/or receive power from a back-up battery inside the endpoint 106 (e.g., the battery 140). The endpoint 106 may have an internal GNSS antenna inside the housing of the endpoint 106 or may be equipped with a connector inside the housing for a remote GNSS antenna.

Each endpoint 106 is shown to include an operation sensor in the form of a vibration sensor 108. The vibration sensor 108 measures the vibrational pattern of the outdoor power equipment 102 in order to determine whether the engine is running (i.e., determining whether the engine is on or off). A Fast Fourier Transform (FFT) may be used in calculating the vibrational pattern of the engine, transforming time to frequency and comparing a combination of frequency ranges and magnitudes to the known values for the specific engine. In some embodiments, additional digital signal processing is used to transform the collected vibration data. The measured vibrational pattern is then compared to the known vibrational pattern for the known engine of the outdoor power equipment 102, with each having a certain characteristic of vibrational pattern that is known. For example, a range of frequencies and magnitudes of the vibrational pattern for a lawn mower's engine is different from the vibrational pattern for a blower's engine. In some embodiments, the vibration sensor 108 is an accelerometer that is used to determine whether the outdoor power equipment 102 is running.

In some embodiments, the operation sensor includes a different type of sensor or sensor array that determines or tracks operation of the outdoor power equipment. For example, the operation sensor may include an ignition sensor that couples to an ignition system of the outdoor power equipment (e.g., for an internal combustion engine), an electromagnetic interference (EMI) sensor (e.g., to recognize shaft rotation), a micro-switch or other proximity sensor used to identify operation (e.g., a trigger pull, an on switch), a current sensor (e.g., for battery powered equipment), or other sensor types that indicate operation of the outdoor power equipment. In some embodiments, the endpoint includes more than operational sensor, or the operational sensor includes a sensor array including more than one sensor type. For example, the operational sensor may include a vibration sensor and a proximity sensor structured to detect a position of a switch.

The enterprise computing system 122 includes any type of computing device that may be used to facilitate the tracking and management of outdoor power equipment. The enterprise computing system 122 may include any wearable and non-wearable device. Wearable devices refer to any type of device that an individual wears including, but not limited to, a watch (e.g., smart watch), glasses (e.g., eye glasses, sunglasses, smart glasses, etc.), bracelet (e.g., smart bracelet), etc. The enterprise computing system 122 may also include any type of mobile device including, but not limited to, a phone (e.g., smartphone, etc.) and/or computing devices (e.g., desktop computer, laptop computer, personal digital assistant, etc.).

The enterprise computing system 122 includes a network interface 124, which is used to establish connections with other components of the environment 100 via the network 104. The network interface 124 includes program logic that facilitates connection of the enterprise computing system 122 to the network 104. The network interface 124 supports communication between the enterprise computing system 122 and other entities, such as the gateway 114, the vehicle 112, or user devices of the operators of the outdoor power equipment 102. For example, the network interface 124 includes a cellular modem, a Bluetooth transceiver, a Bluetooth beacon, an RFID transceiver, and an NFC transmitter. In some embodiments, the network interface 124 includes the hardware and machine-readable media sufficient to support communication over multiple channels of data communication. Further, in some embodiments, the network interface 124 includes the capability to encrypt communications to establish a secure or relatively secure communication session with the enterprise computing system 122 and the gateway 114.

The enterprise computing system 122 further includes an input/output circuit 126. The input/output circuit 126 is configured to receive and provide communication(s) to an operator (e.g., a crew manager of the tracked fleet 120) of the enterprise computing system 122. In this regard, the input/output circuit 126 is structured to exchange data, communications, instructions, etc. with an input/output component of the enterprise computing system 122. As such, in one embodiment, the input/output circuit 126 includes input/output devices such as a display device, a touchscreen, a keyboard, a speaker, and/or a microphone. In another embodiment, the input/output circuit 126 may include communication circuitry for facilitating the exchange of data, values, messages, and the like between an input/output device and the components of the enterprise computing system 122. In yet another embodiment, the input/output circuit 126 may include machine-readable media for facilitating the exchange of information between the input/output device and the components of the enterprise computing system 126. In still an additional embodiment, the input/output circuit 126 may include any combination of hardware components (e.g., a touchscreen), communication circuitry, and machine-readable media.

The enterprise computing system 122 further includes a historical reports database 132. The historical reports database 132 is configured to store, categorize, and otherwise serve as a source for information related to previous archived reports (e.g., crew assigned equipment report 400 (FIG. 4), crew equipment change report 500 (FIG. 5), jobsite activity report 600 (FIG. 6)) from jobs. When referred to herein, "jobs" include any instance of employment of the tracked fleet 120 to perform a task, such as mowing a lawn, cleaning building facilities, clearing a baseball field of debris, etc. The stored historical reports may include information on the name of a crew manager, the number of outdoor power equipment assigned to the crew, the type of outdoor power equipment used by the crew, the model, make, and serial number of the outdoor power equipment, the number of hours the outdoor power equipment has been used thus far, the battery levels of the outdoor power equipment, the electronic serial number (ESN) of a truck for the crew, media access control (MAC) addresses of the outdoor power equipment (i.e., current locations), the last report for each outdoor power equipment, and the date each outdoor power equipment was added to the fleet for the crew (e.g., the tracked fleet 120). The information stored in the historical reports database 132 may also include time sequencing information for each outdoor power equipment used during a job in the tracked fleet 120, such as what time a blower began operating (i.e., was turned on) and what time the blower stopped operating (i.e., was turned off) with respect to the other outdoor power equipment used during the job. Additionally, information on whether any equipment was missing from a tracked fleet after a job or whether there were any additional, unplanned equipment used during a job may also be included in the stored historical reports.

The enterprise computing system 122 further includes an equipment database 134. The equipment database 134 is configured to hold, store, categorize, and otherwise function as a source for various information related to the outdoor power equipment 102. For example, the equipment database 134 offers access to the current number of outdoor power equipment 102 being used in jobs, outdoor power equipment 102 currently stored in a shop (e.g., a repair shop), the maintenance of the outdoor power equipment 102, the type of outdoor power equipment 102 currently being rented by a customer, and so on. The equipment database 134 may also offer access to information relating to missing or broken outdoor power equipment. Additionally, the equipment database 134 may grant access to information regarding a tracked fleet that each outdoor power equipment is assigned to for a crew of employees to use during a job. For example, the equipment database 134 may store the data that the blower 406 (FIG. 4) was assigned to Bob's crew, where Bob is the crew manager of the tracked fleet 120 of outdoor power equipment 102.

The enterprise computing system 122 includes an equipment tracking system 136 for tracking a fleet of outdoor power equipment 102. The equipment tracking system 136 is configured to receive data from the gateway 114, along with data from the historical reports database 132 and the equipment database 134, to track the outdoor power equipment 102 used during jobs to increase security of the outdoor power equipment, efficiency of jobs, and provide proof-of-service to customers requesting the completion of the jobs. In some embodiments, the equipment tracking system 136 is configured to display generated reports on tracked outdoor power equipment on a user interface of the enterprise computing system 122. The equipment tracking system 136 may use the received data to generate reports and notifications on the status of outdoor power equipment 102 while a job is currently ongoing and/or after a job is completed. The equipment tracking system 136 may further be configured to transmit an alert to be displayed on a user device of an operator using one of the outdoor power equipment 102 (e.g., Bob, the crew manager) and/or on a display of the gateway 114. Additional details on the equipment tracking system 136 will be discussed further with regard to FIG. 2.

Data exchange between the gateway 114 and the enterprise computing system 122 of the environment 100 may be facilitated by the network 104 in various combinations. In some embodiments, the network 104 includes cellular transceivers. In another embodiment, the network 104 includes the Internet. In additional embodiments, the network 104 includes a local area network (LAN) or a wide area network (WAN). The network 104 can be facilitated by short and/or long-range communication technologies including RFID transceivers, NFC transceivers, Wi-Fi transceivers, cellular transceivers, wired network connections, etc. As such, in one embodiment, the enterprise computing system 122 is facilitated by and connected to a cloud-based system via RFID and Wi-Fi connections on the vehicle 112 (e.g., a truck), the gateway 114, or trailers. In another embodiment, the enterprise computing system 122 is facilitated by and connected to a cloud-based system via Wi-Fi only. In another embodiment, the enterprise computing system 122 is facilitated by and connected to a cloud-based system via cellular transceivers. In yet another embodiment, the enterprise computing system 122 is facilitated by and connected to a cloud-based system via Bluetooth and cellular transceivers. In still another embodiment, the enterprise computing system 108 is facilitated by and connected to a cloud-based system and used with a self-vending system with which customers can interact to rent equipment. In all such embodiments, the cloud-based system can be made accessible to a third party, such as a consumer, dealer, and fleet operator. In some embodiments, the enterprise computing system 122 can additionally be connected to external third party computing systems for integrated use of those systems.

Figure 1B:
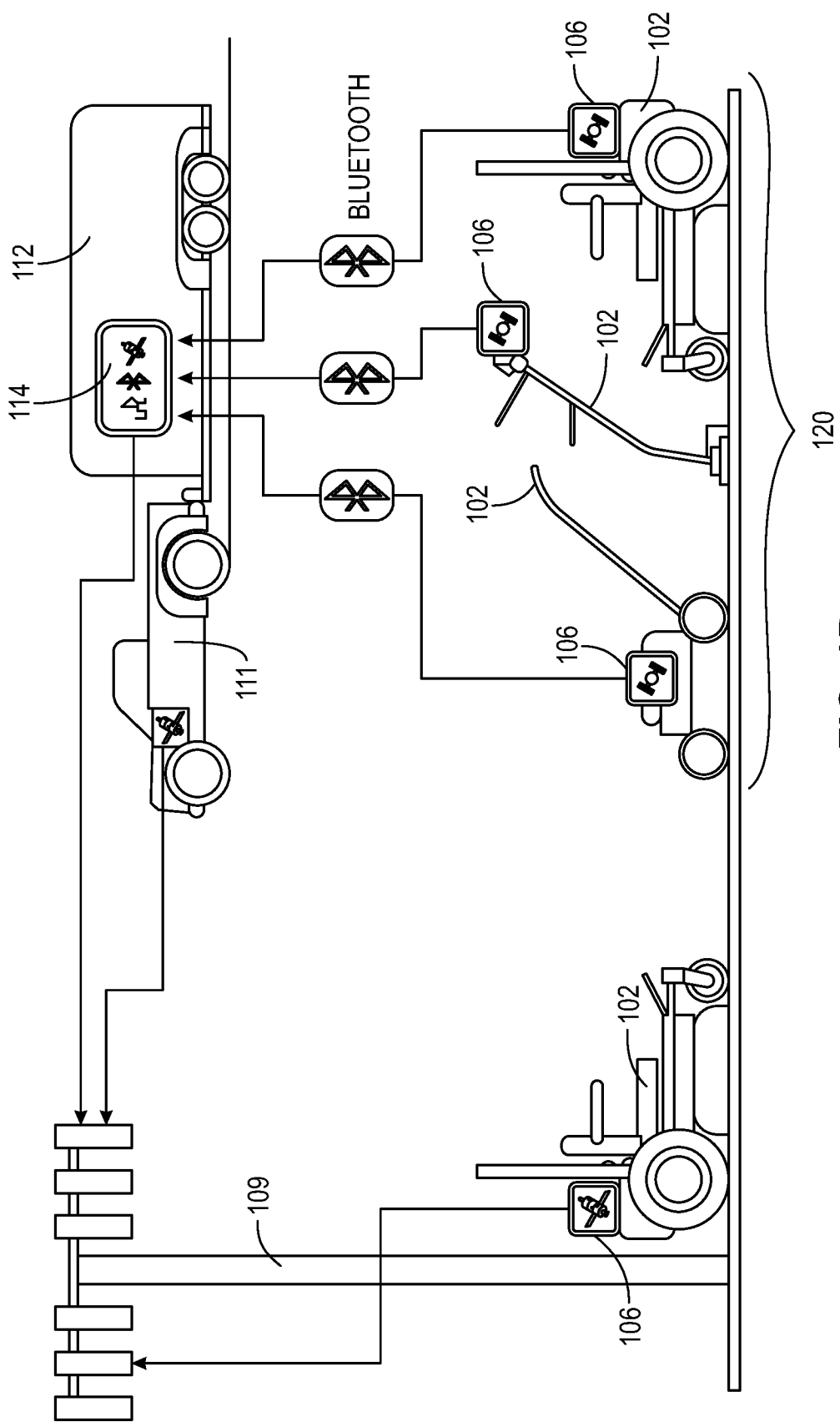
FIG. 1B is an example of a communication system that can be used in the environment of FIG. 1A, according to an exemplary embodiment.

FIG. 1B illustrates an exemplary embodiment of the communication system in the environment 100. In FIG. 1B, a tracked fleet 120 communicates via Bluetooth with the gateway 114 installed in the trailer of the vehicle 112, towed by the truck 111. The tracked fleet 120 includes three outdoor power equipment 102, a push mower, a trimmer, and riding lawn mower, each with an endpoint 106 that corresponds to the respective individual outdoor power equipment 102. The gateway 114 communicates with the cellular tower 109 via cellular radio communications (e.g., via a cellular radio of the network interface 116 shown in FIG. 1A). The truck 111 and the other equipment 105 communicate with the cellular tower 109 as well. In some embodiments, the equipment tracking system 136 and the environment 100 works in conjunction with a fleet management system, such as the fleet management system as described in U.S. patent application Ser. No. 15/615,666. The other equipment 105 may include additional devices that are used in order to correspond to the fleet management system simultaneously. The data received from the gateway 114 pertaining to the endpoints 106 and the tracked outdoor power equipment 104 may be integrated seamlessly into an existing fleet management system. In some embodiments, the gateway 114 uploads the GPS location of the gateway 114, inventory data on the endpoints 106, and runtime data to the fleet management system. For example, the gateway 114 may access data in a cloud for the fleet management system and update the data with inventory on the outdoor power equipment for a current job.

Figure 2:
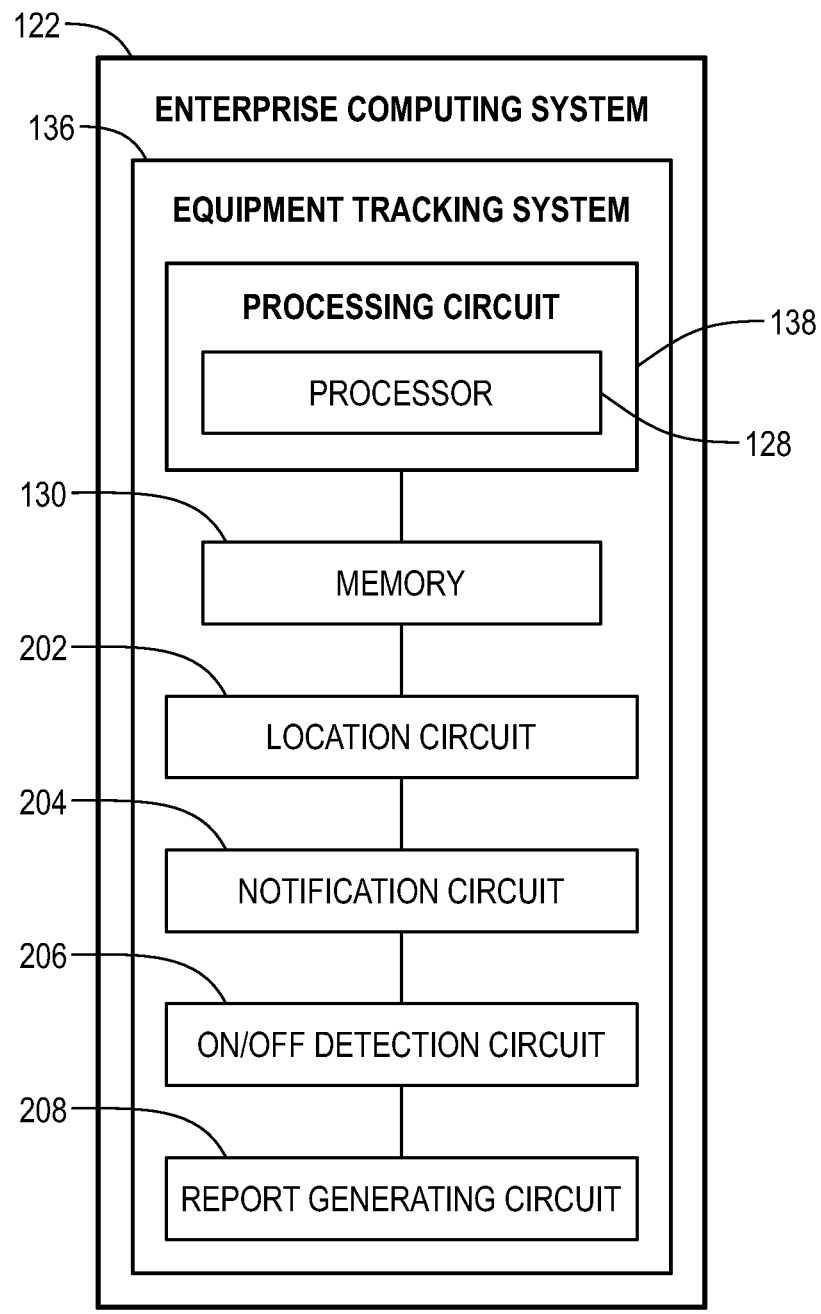
FIG. 2 is a diagram of the equipment tracking system of FIG. 1A, according to an exemplary embodiment.

Referring now to FIG. 2, a diagram of the equipment tracking system 136 and a part of the enterprise computing system 122 is shown, according to an exemplary embodiment. The enterprise computing system 122 is shown to include a processing circuit 138 having a processor 128 and a memory 130. The processor 128 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 130 (e.g., RAM, NVRAM, ROM, Flash Memory, hard disk storage) may store data and/or computer code for facilitating the various processes described herein. Moreover, the one or more memory devices 130 may be or include tangible, non-transient volatile memory or non-volatile memory. Accordingly, the one or more memory devices 130 may include database components, object code components, script components, or any other type of information structure for supporting the various activities and information structures described herein.

In some embodiments, the equipment tracking system 136 may be embodied with the enterprise computing system 122. As such, in some embodiments, the equipment tracking system 136 may be embodied or at least partly embodied in the memory 130, where at least some operations are executable from the processing circuit 138. The equipment tracking system 136 facilitates the tracking and accounting of a tracked fleet 120 (e.g., one or more outdoor power equipment 102). In some embodiments, the equipment tracking system 136 determines when the gateway 114 transmits notifications on tracking information to user devices of a crew manager of the tracked fleet 120. The tracking information may include data on the inventory of one or more endpoints 106 and/or on/off data of the outdoor power equipment 102. In some embodiments, the equipment tracking system 136 stores and manages data received from the gateway 114 on the location and use of one or more outdoor power equipment 102 for a job completed by the crew of the tracked fleet 120. The equipment tracking system 136 additionally facilitates proof-of-service to customers for completed jobs by generating reports and storing saved data on the jobsite activity of the outdoor power equipment, using runtime data from the endpoints 102.

The equipment tracking system 136 is shown to include a location circuit 202, a notification circuit 204, an on/off detection circuit 206, and a report generating circuit 208, with each of the circuits communicably coupled to each other. In other embodiments, the equipment tracking system 136 may include more or less circuits without departing from the spirit and scope of the present disclosure. Additionally, in some embodiments, the activities of one circuit may be combined with another circuit to form a single circuit. As such, those of ordinary skill in the art will appreciate that the present embodiment shown in FIG. 2 is not meant to be limiting.

The location circuit 202 may be configured to receive data from the gateway 114. The received data may include a current location of the gateway 114, determined by a GPS sensor of the gateway 114. The received data may also include specific, on-site time of the gateway 114, when the gateway 114 was within the bounds of a predetermined geographic boundary representing the jobsite for the crew of the tracked fleet 120. For example, the received data may include the duration the gateway 114 was within the bounds of the jobsite (e.g., 5 hours) and may include an exact timestamp of when the gateway 114 was within the bounds of the jobsite (e.g. from 11:00 AM until 4:30 PM). The predetermined geographic boundary may be preset by designating a center point and radius either by a customer of the enterprise associated with the enterprise computing system 122 or by a user of the equipment tracking system 136. In other embodiments, the predetermined geographic boundary is preset by a user of the equipment tracking system 136 or a customer inputting a drawn boundary into the equipment tracking system 136 via a user interface (e.g., a touch screen, a user interface of a computer communicably coupled to the network 104). The location circuit 202 may also be structured to receive location information from the equipment database 134 regarding the current location of various outdoor power equipment 102 and previous locations of outdoor power equipment 102 at past jobsites. The location circuit 202 may use this information to determine what outdoor power equipment 102 are currently going unused at any jobsites, are at a repair shop and need maintenance, are being used for an ongoing job in the tracked fleet 120, and so on.

The notification circuit 204 may be configured to receive information from the gateway 114 and use the received information to generate a notification. As used herein, a "notification" may be an alert, message, instruction to turn on a warning light, etc. In some embodiments, the notification circuit 204 only generates a notification when it is determined that the inventory of endpoints 106 is different when compared to the number of endpoints 106 that are associated with the gateway 114. In other embodiments, the notification circuit 204 automatically generates a notification when the notification circuit 204 receives information from the location circuit 202 that the gateway 114 is outside a boundary (e.g., a predetermined geographic boundary representing a jobsite for the crew of the tracked fleet 120). In yet additional embodiments, the notification circuit 204 creates a notification after a certain amount of time has passed since a job was begun by the crew of the tracked fleet 120 (e.g., 3 hours, halfway through the allotted time to complete the job).

The notification circuit 204 may also be configured to compare the determined inventory of the endpoints 106 to the number of endpoints 106 associated with the gateway 114 for a job. If it is determined from the comparison that the number of endpoints 106 in the inventory is less than the number of endpoints 106 associated with the gateway 114, the generated notification may include a message indicating an endpoint is missing and may indicate the type of outdoor power equipment coupled to the missing endpoint. If it is determined from the comparison that the number of endpoints 106 in the inventory is greater than the number of endpoints 106 associated with the gateway 114 for the job, the generated notification may include a message indicating an endpoint is extra and indicate the type of outdoor power equipment coupled to the extra endpoint. The generated notification may indicate the unique identifiers of missing and/or extra endpoints 106, the type of outdoor power equipment 102 the missing and/or extra endpoints 106 are coupled to, the timestamp of when missing endpoints 106 were last detected by the gateway 114, the last determined location of the missing endpoints 106, the operator of the missing and/or extra endpoints 106, time sequencing information (e.g., a time sequence of when the engine was running) of the outdoor power equipment 102 connected to the missing and/or extra endpoints 106, and so on.

The notification circuit 204 may also be configured to transmit the generated notification to user devices of the operators of the outdoor power equipment 102. For example, when the vehicle 112 leaves a boundary (e.g., half-mile radius from a center point of a building of a customer) of a jobsite, a notification is generated indicating one of the outdoor power equipment 102 (e.g., a blower) was left behind at the jobsite. In this example, the generated notification may be sent to a mobile device of a crew manager of the tracked fleet 120 via the network 104. In other embodiments, the generated notification may be sent to the gateway 114 to be displayed on a LCD screen of the gateway 114.

The on/off detection circuit 206 may be configured to receive information from the gateway 114 pertaining to the on and off status of each piece of outdoor power equipment 102 of the tracked fleet 120. In some embodiments, the on/off detection circuit 206 receives and/or sends data from the equipment database 134 and the historical reports database 132. For example, data on the vibrational pattern of a specific engine for a type of outdoor power equipment 102 (e.g., a lawnmower) is received from the equipment database 134 in order to run data signal processing on collected vibration data from the vibration sensor 108 of endpoints 106. Another example includes the on/off detection circuit 206 sending information to update the amount of time a blower has ran after a completed job to the equipment database 134. The on/off circuit 206 may also send the exact timestamps of when outdoor power equipment 102 ran (e.g., the trimmer ran from a first timestamp of 11:00 AM until a second timestamp of 1:00 PM straight) to be stored in the equipment database 134. In some embodiments, the on/off detection circuit 206 communicates the information on the runtime of the outdoor power equipment 102 to the report generating circuit 208. The report generating circuit 208 may then use the information in the creation of reports on jobsite activity and changes in equipment used by the crew compared to the equipment assigned to the crew for a job. In other embodiments, the on/off circuit 206 also communicates the information on the runtime of the outdoor power equipment 102 to the notification circuit 204 to be used in generating a notification. For example, the on/off circuit 206 may send information regarding the last time that a missing blower was used (i.e., the blower's engine was on) to the notification circuit 204 to indicate in the generated notification details on the missing blower. Additionally, the on/off detection circuit 206 can be configured to associate endpoints 106 with the corresponding outdoor power equipment 102 and the gateway 114 to detect runtime of the equipment during a job.

The report generating circuit 208 may be configured to receive information from the gateway 114, the location circuit 202, the notification circuit 204, and the on/off detection circuit 206 in order to create reports to indicate proof-of-service and identify efficiency and/or problems of a crew, missing and/or extra equipment, use of equipment, and so on. In some embodiments, the generated reports may be the same or similar to the reports shown in FIGS. 4-6. The reports may include crew assigned equipment reports, crew equipment change reports, jobsite activity reports, etc. In some embodiments, the reports include information on the name of the crew, the name of the operators of the outdoor power equipment 102 in the crew, the number of the tracked fleet 120 (e.g., fleet number 5), the type of each of the outdoor power equipment 102 assigned to the crew, changes in the outdoor power equipment that was actually used versus the outdoor power equipment planned to be used by the crew, the date and/or time the outdoor power equipment 102 was used, make and model of the outdoor power equipment 102, tracked locations of the outdoor equipment 102, locations of a jobsite for an assigned crew, time sequencing of when each of the outdoor power equipment 102 was on/off, current usage hours of the tracked outdoor power equipment 102, battery status of the outdoor power equipment 102, etc. In other embodiments, the reports include more or less information than shown in the generated reports of FIGS. 4-6. For example, the reports may include a list of all notifications received during a job, notifications of any missing and/or extra equipment sent to a crew manager, and so on. The report generating circuit 208 may also be configured to transmit the created reports to user devices of a crew manager and/or a user interface of the enterprise computing system 122.

In some embodiments, the report generating circuit 208, the notification circuit 204, or other circuits/systems of the equipment tracking system 136 are structured to generate a history that includes events over time. In some embodiments, the history includes operation information received from operation sensors, location information received from location sensors, inventory information, and associated time stamps. The history can include any information relevant to the endpoints and gateways over time. In some embodiments, the history is packaged as a data packet for communication between the endpoints, the gateways, and the network or cloud computing system. In some embodiments, each individual endpoint generates or is assigned a history and the gateway can aggregate all the histories of connected endpoints. In some embodiments, the gateway generates the history and the endpoints transmit sensor information to the gateway for the generation of the histories. For example, the timestamps may be generated by the endpoints or by the gateways.

Figure 3:
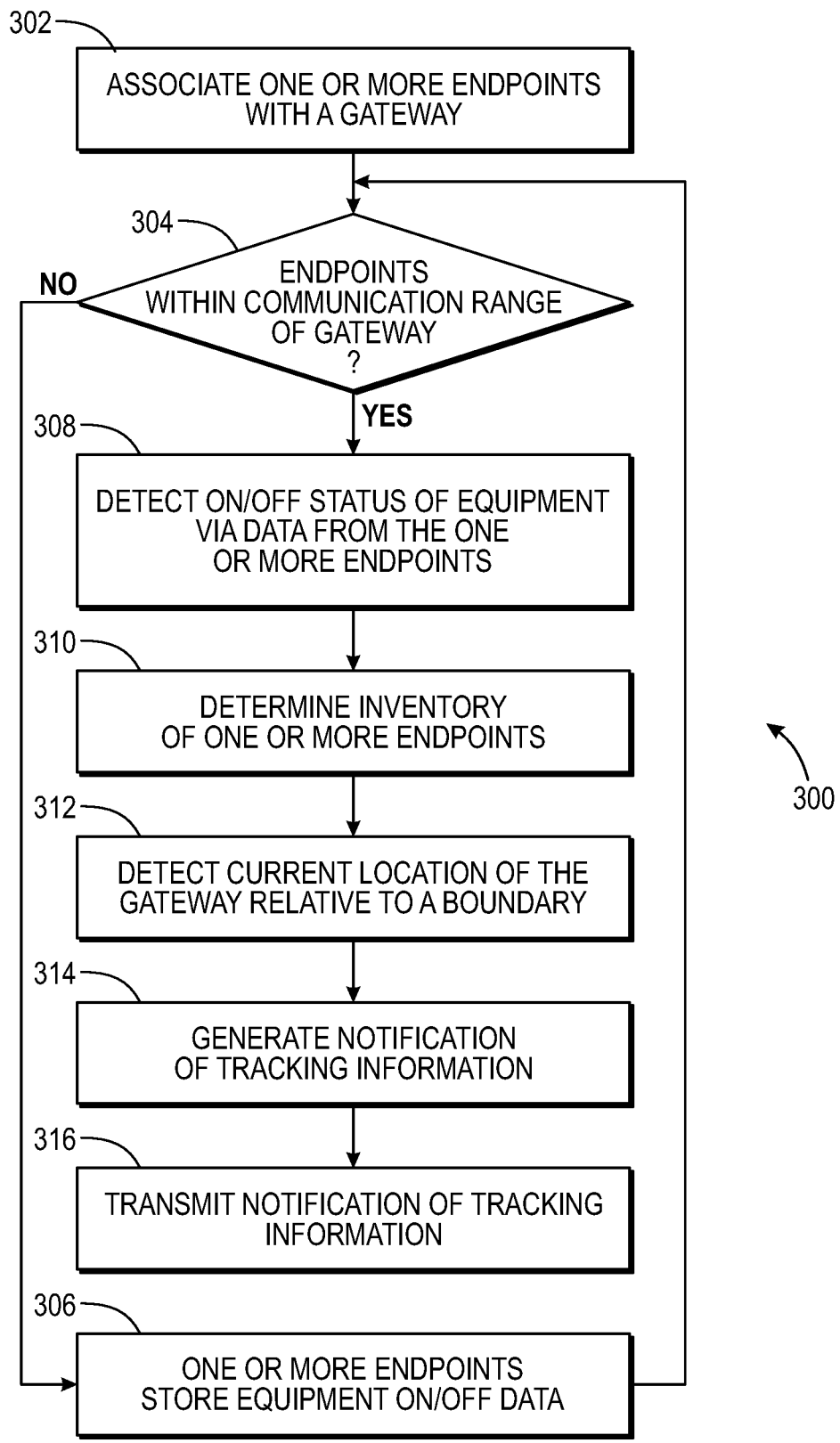
FIG. 3 is a process for tracking one or more pieces of outdoor power equipment connected in a fleet, according to an exemplary embodiment.

Referring now to FIG. 3, a process 300 depicts a method for tracking one or more outdoor power equipment connected in a fleet (e.g., the tracked fleet 120), according to an exemplary embodiment. In some embodiments, the process 300 is carried out by the equipment tracking system 136 by the processing circuit 138. At 302, the equipment tracking system 136 associates one or more endpoints 106 with a gateway 114. In some embodiments, block 302 is carried out by the on/off detection circuit 206. The equipment tracking system 136 may receive manual input from a user via a user interface of the enterprise computing system 122 to associate a certain number of endpoints 106 with the gateway 114. For example, a crew manager may enter, via a keyboard, identifiers for endpoints 106 that will be coupled to five different outdoor power equipment 102 during an upcoming job. The crew manager may then bring the corresponding outdoor power equipment 102 in a vehicle 112 (e.g., a truck), with the gateway 114 connected to the dashboard of the vehicle 112, to the jobsite. The equipment tracking system 136 may also associate the gateway 114 with a location (e.g., the vehicle 112, a repair shop, etc.) after the endpoints 106 are associated with the gateway 114.

In some embodiments, the endpoints 106 are associated with the gateway 114 by tapping each of the endpoints 106 to the gateway 114 to pair using Near Field Communications (NFC). The gateway 114 may be able to define a universe of eligible endpoints 106 unique to that gateway 114 and filter out Bluetooth radios that the gateway 114 is not instructed to listen to during communication. The gateway 114 may include a whitelist of endpoints 106 that the gateway 114 is allowed to listen to in order to track the endpoints 106. In some embodiments, instead of the gateway 114 being positioned in the vehicle 112, the gateway 114 is placed in a shop and identifies what equipment leaves the shop, what equipment needs to be repaired, and may help locate various equipment throughout the shop. In this instance, the gateway 114 may be able to communicate to the equipment tracking system 136 what crew was using the equipment when the equipment was broken and/or the location where the equipment was broken.

The equipment tracking system 136 may determine at 304 whether the endpoints 106 are within a communication range of the gateway 114 via the gateway 114. For example, the gateway 114 listens for Bluetooth radio communications from the endpoints 106 that are associated with the gateway 114, and relays that information back to the network interface 124, communicably coupled to the equipment tracking system 136, via the network 104 (e.g., a cellular network). The gateway 114 may also send back a notification to the equipment tracking system 106 when an endpoint is detected that is not associated with the gateway 114, indicating an unassigned, additional endpoint is detected. If at block 304 it is determined that one of the associated endpoints 106 is not within communication range of the gateway 114, the one or more disconnected endpoints 106 store the on/off data of the corresponding outdoor equipment 102 at 306. The one or more disconnected endpoints 106 may continue to store the on/off data as "events" until the disconnect endpoints 106 are within communication range of the gateway 114 again.

On the other hand, if is detected that the endpoints 106 are within communication range of the gateway 114, the equipment tracking system 136 may detect whether the outdoor power equipment 102 coupled to the endpoints 106 is running (i.e., on/off) via data from the one or more endpoints 106. In some embodiments, the on/off detection circuit 206 carries out the function of process 300 at 310. The on/off data of the outdoor power equipment 102 can then be used to track the usage of the outdoor power equipment 102 and provide proof to customers that a service was completed in a specific amount of time. For example, the on/off data may be used to show that a lawnmower was being operated continuously by a crewmember from 9 AM until 11 AM. At 310, the equipment tracking system 136 may determine the inventory of the one or more endpoints 106 via data received from the gateway 114 on detected endpoints 106 communicating via Bluetooth with the gateway 114. The inventory of the endpoints 106 may include a count of each of the detected endpoints 106 within the communication range of the gateway 114. The inventory may also include the unique identifiers of each of the detected endpoints 106, a location of the endpoints 106, and the type of outdoor power equipment 102 (e.g., a lawnmower versus a trimmer) coupled to the one or more detected endpoints 106.

At 312, the equipment tracking system 136 may detect a current location of the gateway 114 relative to a boundary (e.g., a predetermined geographic boundary of the jobsite). In some embodiments, the location circuit 202 carries out the block 312 using GPS data received from the location sensor 118 of the gateway 114. The boundary may be pre-entered by a customer of the enterprise associated with the enterprise computing system 122, or may be pre-entered by a user of the equipment tracking system 136 via a user interface. For example, a crew manager may pre-enter the boundary of a jobsite for cutting and cleaning fields surrounding a building before departing for the jobsite. In some embodiments, at 312 if the location circuit 202 determines that the location of the gateway 114 is not within the boundary, the location circuit 202 may send a message to the on/off detection circuit 206 to repeat 310 and take another count of the endpoints 106 within the communication range of the gateway 114. By taking an inventory of the endpoints 106 when the gateway 114 is no longer in the boundary of the jobsite, the equipment tracking system 136 can beneficially determine whether all the assigned equipment is accounted for and whether any equipment was left behind at the jobsite.

At 314, the equipment tracking system 136 may generate a notification of tracking information on the inventory of the endpoints 106 coupled to the outdoor power equipment 102 and on/off data of the outdoor power equipment 102. In some embodiments, the notification circuit 204 carries out block 314 after a certain amount of time passes from the beginning of a job (e.g., an hour after the job begins). In other embodiments, the notification circuit 204 generates the notification to alert a crew manager via a user device of the inventory of the outdoor power equipment when the vehicle 112, with the gateway 114, is no longer on-site. The notification may be an alert generated to be displayed on a user device (e.g., a smartphone, a tablet, a desktop computer, a laptop computer) and/or to be displayed on a user interface of the gateway 114 (e.g., a display screen). At 316, the equipment tracking system 136 may transmit the notification of tracking information. In some embodiments, the notification circuit 204 transmits the generated notification to the gateway 114 and/or user devices (e.g., cellphones) of the crew in a text and/or email via the network 104. In other embodiments, the generated notification may be transmitted to the vehicle 112 to be displayed on a user interface (e.g., a touch screen display) of the dashboard of the vehicle 112.

Referring now to FIG. 4, a report 400 depicting the crew assigned equipment is shown, according to an exemplary embodiment. The report 400 may be created by the report generating circuit 208 of the equipment tracking system 136. In some embodiments, the report 400 displays which outdoor power equipment 102 is assigned to each crew (e.g., one or more users of the outdoor power equipment 102, such as a crew manager and crewmembers that operate the equipment). In some embodiments, the report 400 is displayed to show the members of the crew where the outdoor power equipment 102 should be located. For example, the report 400 may display a current location of a lawnmower as in a shop for maintenance. The report 400 may include a timestamp (e.g., Wed, Aug. 6, 2018) of when the report was created. In this embodiment, the report 400 includes Bob's truck 402, trimmer 404, blower 406, edger 408, and trimmer-curved 410 as the assigned outdoor power equipment 102 of Bob's crew 412. The report 400 may include information on the name of each outdoor power equipment, make, model, serial number, current usage hours, battery status, electronic serial number (ESN), media access control (MAC) Address, the last report, and the date each of the outdoor power equipment 102 was added to the fleet for Bob's crew 412. The generated report 400 may function as a baseline for changes to the equipment of a crew (e.g., Bob's crew 412). In some embodiments, the report 400 is sent to a user device of the crew manager (e.g., Bob) before a new job begins.

Referring now to FIG. 5, a report 500 indicating the crew equipment changes is shown, according to an exemplary embodiment. The report 500 may also be generated by the report generating circuit 208 of the equipment tracking system 136. The report 500 may display a comparison of the assigned outdoor power equipment 102 to one or more crews with the outdoor power equipment 102 that was actually used by the one or more crews. In some embodiments, the report 500 shows the outdoor power equipment 102 used by a crew (e.g., Bob's crew 412) each day. For example, the report 500 may show the use of equipment for a multiple day job, such as from Monday, August 5 to Friday, August 9. The report 500 may be generated with the assumption that all pull start outdoor power equipment in the report is tracked. The report 500 may include a list of the outdoor power equipment 102 planned to be used (shown with a black asterisk 530, in some examples) and a truck 510 assigned to Bob's crew 412. The generated report 500 may indicate changes in the overall equipment used by one or more crews and provide an indication of where equipment went missing from (e.g., what crew the equipment was borrowed from) and where extra equipment is located (e.g., what crew used the borrowed equipment). For example, the row next to truck 510 provides an overall indication of whether only the planned outdoor power equipment 102 was used by the crew (e.g., shown by a black check mark) or whether there was either missing equipment or extra equipment different from what was planned (e.g., shown by a red "X" box).

In some embodiments, the report 500 may color code information that is unexpected and/or indicates missing/extra equipment using red. The report 500 shows an extra trimmer 502 and an extra push mower 504 that were not planned equipment for Bob's crew 412 and were borrowed from the crew of truck 506. In some embodiments, a black check mark in a row for to a type of equipment indicates the equipment was planned and was used by the crew, a red "X" box in a row for a type of equipment indicates planned equipment was not used by the crew or was missing, and a red check mark in a row for a type of equipment indicates equipment was used, but not planned to be used by the crew (i.e., is extra equipment that was not in the crew assigned equipment report 400). For example, red "X" box 508, red "X" box 512, and red "X" box 514 indicate that the crew of truck 510 did not use the correct equipment that was planned for on a certain day. The red "X" box 508 is included because the extra trimmer 502 and the extra push mower 518 were used and borrowed from the truck 506 on Tuesday. The red "X" box 512 may indicate the equipment used on Thursday was different from what was planned because the edger 408 was not used by the crew of truck 510 and instead was borrowed by the crew of the truck 506 (e.g., shown by the red check mark 526 for extra edger 524 used by the crew of truck 506 in the last row of the report 500). The red "X" box 514 shows that equipment for the crew of the truck 510 was different from what was planned because the trimmer 404 was unaccounted for (e.g., shown by the red "X" box in the row of the trimmer 404) and the extra push mower 504 was used (e.g., shown by the red check mark 520) and borrowed from the truck 506. The black check mark 528 indicates Bob's truck 402 was planned equipment for the crew and used by the crew on Monday.

As another example, the red check mark 516 indicates the trimmer 502 was not planned, but was used by the crew on Tuesday and borrowed from the crew of truck 506, and the red check marks 518 and 520 indicate the push mower 504 was not planned equipment; however, the push mower 504 was used by Bob's crew 412 on Tuesday and Friday and borrowed from the crew of truck 506 as well. This corresponds with the indication on Tuesday that the truck 506 was missing a trimmer and a push mower (e.g., shown by the two red "X" boxes) because the equipment was being used by the crew of the truck 510 that day. The report 500 also shows another comparison of planned equipment to equipment the crew used for truck 506. A red check mark 526 may indicate an extra edger 524 was used by the crew of truck 506. The listing of truck 510 in the same row as the red check mark 526 indicates where the extra edger 524 was borrowed from, allowing a crew manager viewing the report 500 to determine where to return extra equipment or why equipment was missing from the truck 510. In some embodiments, more or less crews can be shown in the report 500. The general format and the user interface of the report 500 is shown for illustrative purposes only, and is not meant to be limiting. In other embodiments, the report 500 may be arranged in different formats and designed for various user interfaces.

Figure 6:
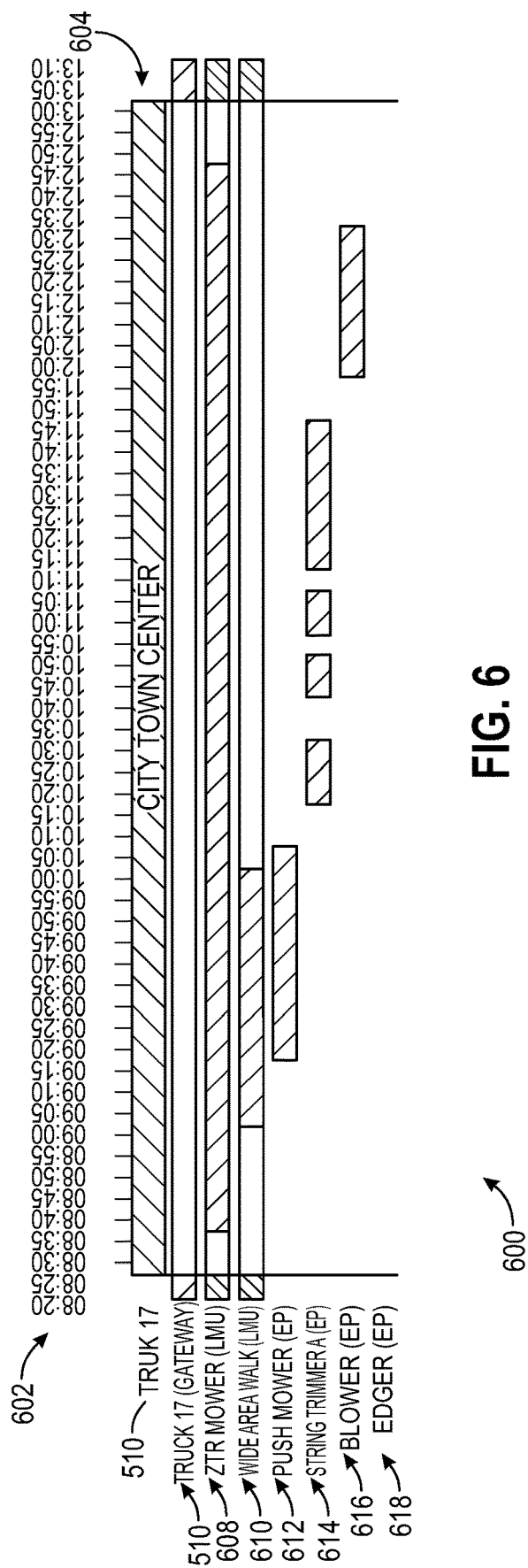
FIG. 6 is a report depicting jobsite activity of outdoor power equipment of a crew, according to an exemplary embodiment.

Referring now to FIG. 6, a report 600 indicating jobsite activity is shown, according to an exemplary embodiment. In some embodiments, the report 600 is generated by the report generating circuit 208 of the equipment tracking system 136 after a completion of a job. In other embodiments, the report 600 is generated when it is determined by the location circuit 202 that the gateway 114 is no longer within the boundary of the jobsite. In this example, the report 600 may display jobsite activity for a single day. In other examples, the report 600 may include activity for several days or for different jobs in order to compare the efficiency of a crew for different jobs. The report 600 is shown to include a timeline 602, a jobsite location 604, truck 510, and the outdoor power equipment 102 used for the job. The outdoor power equipment 102 used during the job that the report 600 was generated for includes truck 510, with a gateway 114 located within the truck 510, a ZTR mower 608, a Wide Area Walk mower 610, a push mower 612, a string trimmer 614, a blower 616, and an edger 618. The push mower 612, the string trimmer 614, the blower 616, and the edger 618 may all include endpoints (EP) 106 coupled to each of the outdoor power equipment. The report 600 may show the time that the crew was at the jobsite (e.g., the mall), such as from 8:25 AM to 1:00 PM, shown using the timeline 602 and the jobsite location 604 in orange.

In some embodiments, the activity of the outdoor power equipment 102 is shown using a graph indicating when the equipment was running (i.e., on). For example, the report 600 shows that the power mower 612 was on from 9:15 AM to 10:05 AM. The purpose of the report 600 may be to show the sequence (e.g., the order that outdoor power equipment 102 is used) that a crew completes a job (e.g., cutting a lawn). The report 600 may display which outdoor power equipment 102 is used and when each of the outdoor power equipment 102 in the tracked fleet 120 is used for each job. The report 600 may comprise timestamps of each piece of outdoor power equipment 102 turning on/off to display time sequencing of the operation of the pieces of one or more outdoor power equipment. As such, the report 600 may aid a manager in analyzing how the equipment performs and review if the crew is executing a job efficiently (e.g., the crew uses cutting equipment before blowing equipment or vice versa). One insight that may be gained from reviewing the report 600 is that a crew started mowing before 9:00 AM and nobody blew grass off sidewalks until noon, shown by the blower 616 turning on at a first timestamp of 12:00 PM. Another insight that may be gained from the report 600 is that 15 minutes were spent loading up the equipment at the end of the day, indicated by the last piece of outdoor power equipment 102 being on at a timestamp of 12:45 PM and the truck 510 did not turn on again until a timestamp of 1:00 PM. An additional insight may be that three operators were assigned to the crew, but only two pieces of the outdoor power equipment 102 were used for 3 hours. Yet another insight may be that the blower 616 and the string trimmer 614 finished operating (i.e., were not turned on again) before the ZTR mower 608 was done mowing. Still an additional insight may be that if the supervisor of the crew ran the ZTR mower 608 for 4 hours without stopping, no one was supervising the rest of the crewmembers. Another insight may be that a production manager never stopped by the jobsite location 604, indicated by the fact that the supervisor on the ZTR mower 608 never stopped operating the equipment to discuss with a production manager. As such, the report 600 may beneficially allow crew managers and/or production managers to see the efficiency and sequence of a crew completing a job and demonstrate proof-of-service to customers.

Figure 8D:
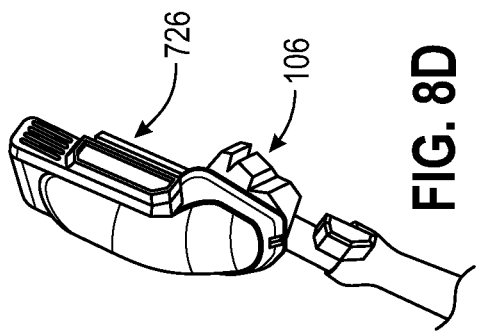
FIGS. 8A-K are examples of the placements of an endpoint on various equipment, according to an exemplary embodiment.
Figure 8C:
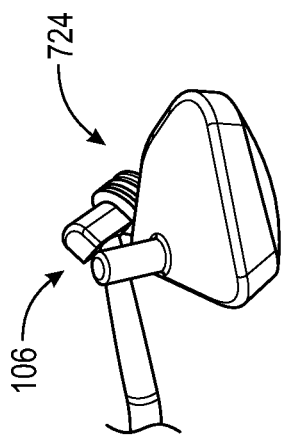
Figure 8B:
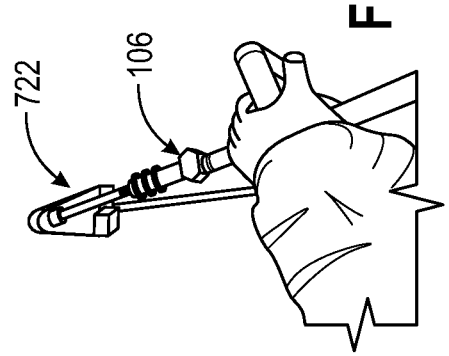
Figure 8A:
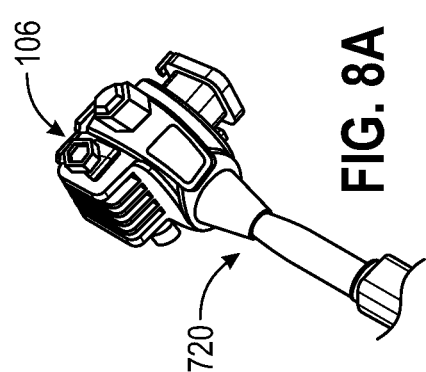
Figure 8G:
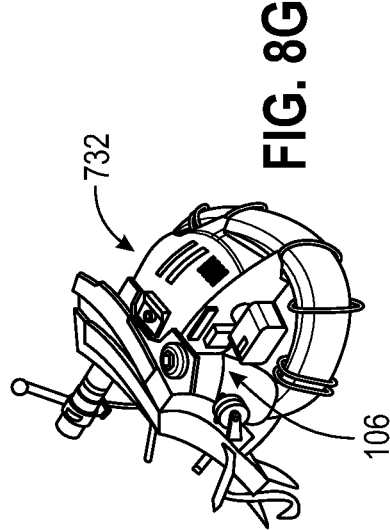
Figures 8E, 8F:
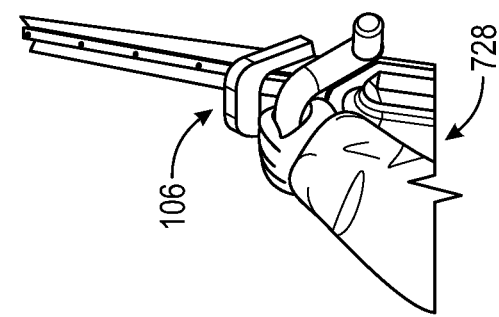
Figure 8H:
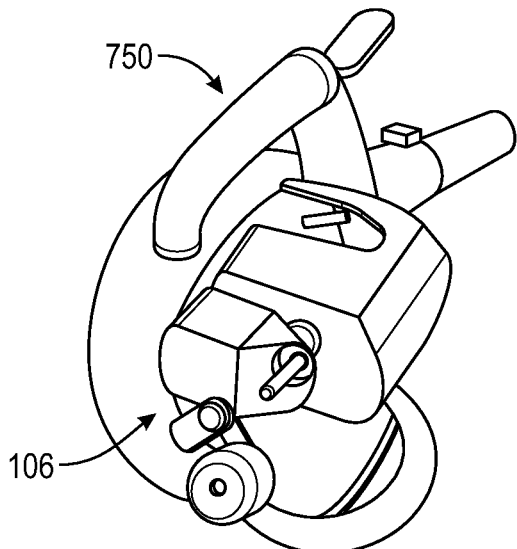
Figure 8I:
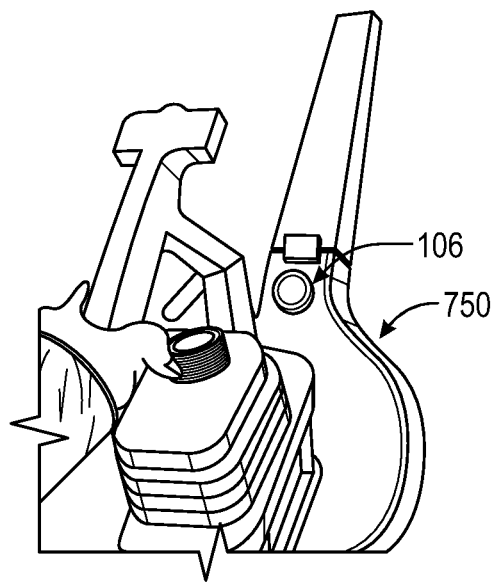
Figure 8J:
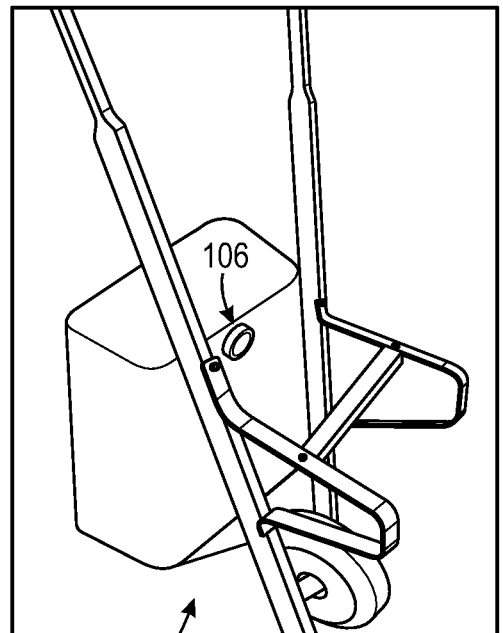
Figure 8K:
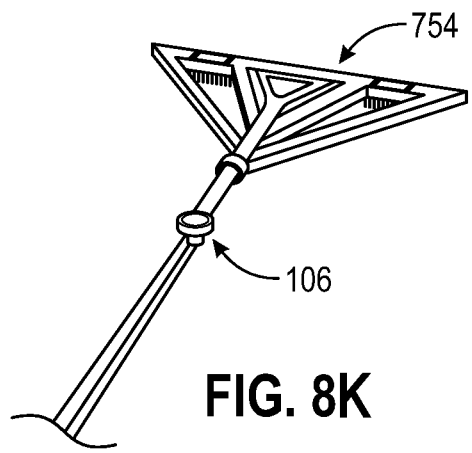

Referring now to FIG. 7, a series of perspective views 700 of an endpoint 106 to be used with the equipment tracking system 136 is shown, according to an exemplary embodiment. FIG. 7 is shown to include a context view 702 to illustrate the comparison in size between an outdoor power equipment 102 (e.g., a chainsaw) and the endpoint 106. The first mounting view 712 shows an endpoint 106 from a top view and side view that may be mounted with zip-ties. The second mounting view 704 shows a perspective view of an endpoint 106 that may be mounted with rivets or bolts. Exploded view 706 of the endpoint 106 shows a quarter-turn with on O-ring seal between two halves of the endpoint 106. Perspective view 708 shows a top side of the endpoint 106 and perspective view 710 shows a side view of the endpoint 106. View 714 shows a zoomed-in view of the endpoint 106 with a commercial grade design. FIGS. 8A and 8B depict example placements of the endpoint 106 on outdoor power equipment 102, according to exemplary embodiments. FIG. 8A includes views of the placement of the endpoint 106 on outdoor power equipment such as: hedger 720, string trimmer 722, string trimmer 724, hedger 726, chainsaw 728, chainsaw 730, and backpack blower 732. FIG. 8B includes views of the placement of the endpoint 106 on outdoor power equipment such as: handheld blower 750, wheelbarrow 752, and rake 754. In other embodiments, the endpoints 106 may be placed on other types of outdoor equipment that is used by crews doing maintenance on fields, parking lots, lawns, etc. In some embodiments, the endpoints 106 are used on outdoor equipment that do not include engines (e.g., the wheelbarrow 752 and the rake 754). In embodiments where the outdoor equipment does include an engine (e.g., the handheld blower 750), the endpoints 106 may be positioned close to or on the engine of the outdoor equipment. This may allow the vibration sensors 108 of the endpoints 106 to collect the most accurate vibration data to use in determining whether an engine is running or not.

Referring now to FIG. 9, a series of perspective views 800 of a gateway 114 to be used with the equipment tracking system 136 is shown, according to an exemplary embodiment. FIG. 9 is shown to include a bottom perspective view 806 and a side perspective view 804. A status of the gateway 114 may be visible to a viewer of the gateway 114 at any angle (e.g., from the angle of the bottom perspective view 806 and from the angle of the side perspective view 804). Output and input ports of the gateway 114 can be seen from a side perspective view, showing output/input ports 808-814. In some embodiments, the spaces for output/input ports 808-814 may be for 12 Volt (V) power, a USB C cable, dual antennas, etc. The perspective view 802 shows a zoomed-in perspective of the gateway 114 and the commercial grade design of the gateway 114. The realistic top perspective view 816 of the gateway 114 shows an option for a gateway 114 with digital display. FIG. 9 also includes a top view drawing 118, a side view drawing 120, and a bottom view drawing 122.

Figure 10:
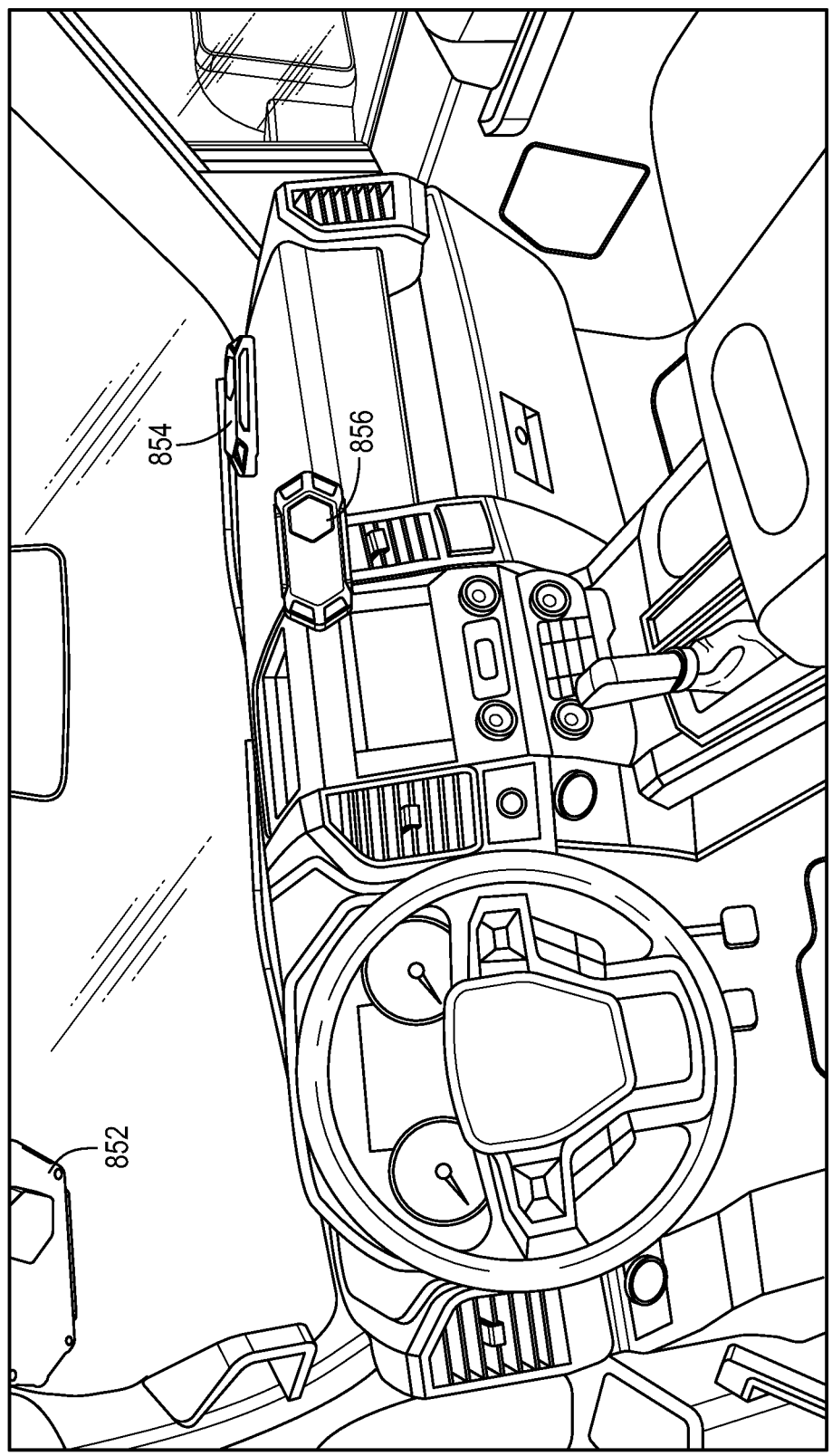
FIG. 10 is an environment showing ways a gateway can be placed in a vehicle, according to an exemplary embodiment.

FIG. 10 depicts an environment 850 showing various ways the gateway 114 can be placed in a vehicle, according to exemplary embodiments. The environment 850 shows three different ways and locations of where the gateway 114 may be coupled to the vehicle 112. Attachment 852 is shown to be above the steering wheel and may couple to the vehicle 112 using Velcro strips or a suction cup. Attachment 854 is shown to be on the top of the dashboard of the vehicle 112 and may couple to the vehicle 112 using a grip dash pad. Attachment 856 is coupled to the air vents of the vehicle 112 and may be coupled to the vehicle 112 using an air vent clip. In some embodiments, additional attachments may be used to greater secure the gateway 114. The locations and attachments of the gateway 114 in FIG. 10 are meant for illustrative purposes only and are not meant to be limiting with regard to other potential embodiments for the location and attachment of the gateway 114 to the vehicle 112.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

The construction and arrangements of the present disclosure, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An equipment tracking system comprising:
   an endpoint structured to be coupled to an outdoor power equipment and including:
      an operation sensor structured to provide operational information indicative of an operational status of the outdoor power equipment, and
      a transmitter structured to wirelessly transmit the operational information;
   a gateway installed on or within a trailer, the gateway including a receiver structured to receive the operational information from the endpoint and a gateway location sensor structured to transmit gateway location information; and
   one or more processing circuits comprising one or more memory devices coupled to one or more processors, the one or more memory devices configured to store instructions thereon that, when executed by the one or more processors, cause the one or more processors to:
      associate the operational information with a timestamp, wherein the timestamp includes a time when the outdoor power equipment turned on, how long the outdoor power equipment was operational, and a time when the outdoor power equipment turned off,
      record a history of operational information and associated timestamps, and
      compare the gateway location information to a predetermined boundary of a jobsite to determine a duration that the gateway is present at the jobsite;
      transmit the history to an external device.

2. The equipment tracking system of claim 1, further comprising a second endpoint associated with a second outdoor power equipment,
   wherein the one or more memory devices are further configured to store instructions thereon that, when executed by the one or more processors, cause the one or more processors to:
      record a second history associated with the second endpoint, and
      transmit the second history to the external device.

3. The equipment tracking system of claim 1, wherein the endpoint further includes an endpoint location sensor structured to transmit endpoint location information,
   wherein the receiver of the gateway is further structured to receive the endpoint location information, and
   wherein the one or more memory devices are further configured to store instructions thereon that, when executed by the one or more processors, cause the one or more processors to:
      determine an inventory based on the endpoint location information, and
      transmit the inventory to the external device.

4. The equipment tracking system of claim 3, wherein the endpoint location information includes a communication status of the endpoint and the gateway indicating that the endpoint is within a predefined range of the gateway or is not within the predefined range of the gateway.

5. The equipment tracking system of claim 3, wherein the inventory includes a presence or absence of the endpoint within a range of the gateway.

6. The equipment tracking system of claim 1,
   wherein the one or more memory devices are further configured to store instructions thereon that, when executed by the one or more processors, cause the one or more processors to:
      transmit the history when the gateway exits the jobsite.

7. The equipment tracking system of claim 1, wherein the gateway further includes a user interface structured to display the history.

8. The equipment tracking system of claim 1, wherein the operation sensor includes a vibrational sensor, and
   wherein the one or more memory devices are further configured to store instructions thereon that, when executed by the one or more processors, cause the one or more processors to:
      identify a type of the outdoor power equipment associated with the endpoint,
      determine a range of operational vibrational frequencies and magnitudes of the type of the outdoor power equipment,
      determine an operation state of the outdoor power equipment based on the operational information and the determined range of operational vibrational frequencies and magnitudes, and
      transmit the operational state as a part of the history.

9. The equipment tracking system of claim 1, further comprising a battery, wherein the battery is configured to supply power to the endpoint.

10. A system comprising:
    one or more processing circuits comprising one or more memory devices coupled to one or more processors, the one or more memory devices configured to store instructions thereon that, when executed by the one or more processors, cause the one or more processors to:
       identify a type of an outdoor power equipment;
       receive, from an endpoint physically coupled to the outdoor power equipment, operational information indicative of an operational status of the outdoor power equipment and endpoint location information indicative of a location of the outdoor power equipment;
       receive, from a gateway location sensor of a gateway installed on or within a trailer, a gateway location information;
       associate the operational information and the endpoint location information with a timestamp;

record a history of operational information, endpoint location information, and associated timestamps, wherein the endpoint location information includes a communication status of the endpoint and a gateway indicating when the endpoint is within a predefined range of the gateway and when the endpoint is not within the predefined range of the gateway;

compare the gateway location information to a predetermined boundary of a jobsite to determine a duration that the gateway is present at the jobsite;

generate an inventory based on the endpoint location information;

generate a report including the history and the inventory; and transmit the report to an external device.

11. The system of claim 10, wherein the one or more memory devices are further configured to store instructions thereon that, when executed by the one or more processors, cause the one or more processors to:

receive, from a gateway communicably coupled to the endpoint, gateway location information indicative of a location of the gateway;

compare the gateway location information to a predetermined boundary of a jobsite; and transmit the report when the gateway location information exits the jobsite.

12. The system of claim 10, wherein the timestamp includes a time when the outdoor power equipment turned on, how long the outdoor power equipment was operational, and a time when the outdoor power equipment turned off.

13. The system of claim 10, wherein the one or more memory devices are further configured to store instructions thereon that, when executed by the one or more processors, cause the one or more processors to:

determine a range of operational vibrational frequencies and magnitudes of the type of the outdoor power equipment, determine an operation state of the outdoor power equipment based on the operational information and the determined range of operational vibrational frequencies and magnitudes, and transmit the operational state as a part of the history.

14. The system of claim 10, further comprising a battery, wherein the battery is configured to supply power to the endpoint.

15. A method comprising:

installing an endpoint on an outdoor power equipment;

installing a gateway in a vehicle;

associating the endpoint with the gateway;

wirelessly communicating, from the endpoint to the gateway, operational information and endpoint location information indicative of a location of the outdoor power equipment;

determining an operational status of the outdoor power equipment based on the operational information;

comparing a gateway location to a predetermined boundary of a jobsite to determine a duration that the gateway is present at the jobsite;

associating the operational status and the endpoint location information with a timestamp;

recording a history of operation status, endpoint location, the duration that the gateway is present at the jobsite, and associated timestamps;

generating an inventory based on the endpoint location information;

generating a report including the history and the inventory; and transmitting the report to an external device when the gateway exits the predetermined boundary of the jobsite.

16. The method of claim 15, wherein the endpoint location information includes a communication status of the endpoint and the gateway indicating that the endpoint is within a predefined range of the gateway or is not within the predefined range of the gateway.

17. The method of claim 15, wherein the timestamp includes a time when the outdoor power equipment turned on, how long the outdoor power equipment was operational, and a time when the outdoor power equipment turned off.

18. The method of claim 15, wherein the history includes time that the outdoor power equipment is not operational.

19. The method of claim 15, further comprising supplying, by a battery, power to the endpoint.

\* \* \* \* \*